US008848589B2

(12) United States Patent
Wang et al.

(10) Patent No.: US 8,848,589 B2
(45) Date of Patent: Sep. 30, 2014

(54) METHOD, SYSTEM AND BASE STATION FOR TRANSMITTING BROADCAST SERVICE DATA IN A SINGLE FREQUENCY NETWORK (75) Inventors: Yingmin Wang, Beijing (CN); Yu Ding, Beijing (CN); Jiajun Yang, Beijing (CN); Lei Mao, Beijing (CN); Junyun Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 587 days.

(21) Appl. No.: 12/515,675

(22) PCT Filed: Nov. 15, 2007

(86) PCT No.: PCT/CN2007/003227
§ 371 (c)(1),
(2), (4) Date: Dec. 21, 2009

(87) PCT Pub. No.: WO2008/061437
PCT Pub. Date: May 29, 2008

(65) Prior Publication Data
US 2010/0315984 A1    Dec. 16, 2010

(51) Int. Cl.
*H04H 20/71* (2008.01)
*H04W 4/00* (2009.01)
*H04W 72/00* (2009.01)
*H04W 88/12* (2009.01)

(52) U.S. Cl.
CPC ............ *H04W 72/005* (2013.01); *H04W 88/12* (2013.01)
USPC ........................................ 370/312; 455/422.1

(58) Field of Classification Search
USPC .......................................................... 370/312
See application file for complete search history.

(56) References Cited

U.S. PATENT DOCUMENTS

| 7,197,288 | B1* | 3/2007 | Ngan et al. ................ 455/186.1 |
| 2005/0201407 | A1* | 9/2005 | Kim et al. ..................... 370/432 |
| 2008/0085701 | A1* | 4/2008 | Darwood et al. .......... 455/422.1 |

FOREIGN PATENT DOCUMENTS

| CN | 1728865 A | 2/2006 |
| CN | 1728871 A | 2/2006 |

(Continued)

OTHER PUBLICATIONS

International Search Report and Written Opinion mailed Feb. 14, 2008 for International Application No. PCT/CN2007/003227.

(Continued)

*Primary Examiner* — Noel Beharry
(74) *Attorney, Agent, or Firm* — Sutherland Asbill & Brennan LLP (57) ABSTRACT A method for transmitting broadcast service data in a single frequency network including a Radio Network Controller and one or more base stations each with a cell including one or more sectors, the method includes: transmitting, by the Radio Network Controller, broadcast service data and a first transmission time to the base station; and transmitting, by the base station, the broadcast service data to each of its sector after the first transmission time, where the broadcast service data is transmitted to adjacent sectors sharing a common station address at different transmission times. Also, the present invention discloses a system and base station for transmitting broadcast service data in a single frequency network. With this technical solution, the phenomenon of fast fading of received signals in the prior art which occurs at adjacent edge zones of adjacent sectors in the same cell of the single frequency network can be avoided, and thus improving performance of receiving the signals.

3 Claims, 4 Drawing Sheets (56) References Cited

FOREIGN PATENT DOCUMENTS

| | | |
|---|---|---|
| CN | 1863355 A | 11/2006 |
| EP | 1605607 A1 | 12/2005 |

OTHER PUBLICATIONS

English Translation of CN1728865 published Feb. 1, 2006.
English Translation of CN1728871 published Feb. 1, 2006.
English Translation of CN1863355 published Nov. 15, 2006.
Search Report for European Application No. 07816833.3-2412 dated Nov. 27, 2012.
"Digital cellular telecommunications system (Phase 2+); Universal Mobile Telecommunications System (UMTS); Multimedia Broadcast/Multicast Service (MBMS); Stage 1 (3GPP TS 22.146 version 7.2.0 Realease 7)." ETSI TS 122 146 v7.2.0 (Sep. 2006). 3GPP TS 22.146 version 7.2.0 Release 7. 20 pages.
Institute for Infocomm Research et al. "Intra-Node B Macro Diversity based on Cyclic Delay Transmissions," 3GPP TSG RAN WG1 #42 on LTE, R1-050795. London, UK, Aug. 29-Sep. 2, 2005. 5 pages.
"3rd Generation Partnership Project; Technical Specification Group Radio Access Network; Evolved UTRA and UTRAN; Radio Access Architecture and Interfaces (Release 7)." 3GPP TR T3.018 V0.6.0 (Oct. 2006). 122 pages.

* cited by examiner

| Group identifier | 1 | 2 | 3 |
|---|---|---|---|
| Sector identifier | 0 | 1 | 2 |
| | 3 | 4 | 5 |
| | 6 | 7 | 8 |
| | 9 | 10 | 11 |
| | 12 | 13 | 14 |
| | 15 | 16 | 17 |
| | 18 | 19 | 20 |
| | 21 | 22 | 23 |
| | 24 | 25 | 26 |
| | 27 | 28 | 29 |
| | 30 | 31 | 32 |
| | 33 | 34 | 35 |
| | 36 | 37 | 38 |
| | 39 | 40 | 41 |
| | 42 | 43 | 44 |
| | 45 | 46 | 47 |
| | 48 | 49 | 50 |
| | 51 | 52 | 53 |
| | 54 | 55 | 56 |
| Delay unit | 0 chip | 4 chips | 8 chips |

METHOD, SYSTEM AND BASE STATION FOR TRANSMITTING BROADCAST SERVICE DATA IN A SINGLE FREQUENCY NETWORK

RELATED APPLICATIONS

This is a submission pursuant to 35 U.S.C. 154(d)(4) to enter the national stage under 35 U.S.C. 371 for PCT/CN2007/003227, filed Nov. 15, 2007. Priority is claimed under 35 U.S.C. 119(a) and 35 U.S.C. 365(b) to Chinese Patent Application No. 200610114653.8, filed Nov. 20, 2006.

FIELD OF THE INVENTION

The present invention relates to the field of radio communication technologies and in particular to a method, system and base station for transmitting broadcast service data in a single frequency network.

BACKGROUND OF THE INVENTION

Numerous multimedia services have emerged along with rapid development of mobile communication and the Internet, and in some of the application services such as Video-On-Demand, television broadcast, video conferencing, online education, and interactive games, a plurality of users need to receive the same data simultaneously. These mobile multimedia services are characterized by a large amount of data, a long duration, etc., as compared with general services. For effective utilization of mobile network resources, the 3$^{rd}$ Generation Partnership Project (3GPP) of Mobile Communication Standardization organization has proposed the Multimedia Broadcast/Multicast Service (MBMS). The MBMS refers to a point-to-multipoint service for transmitting data to a plurality of users from one data source, which enables sharing of network resources including mobile core network and access network resources, particularly air interface resources. The MBMS can accomplish not only the multicast and broadcast of plain-text and low rate messages but also the multicast and broadcast of high rate multimedia services, e.g., a mobile TV service.

The MBMS suffered from a low spectral efficiency which is typically at 0.2~0.02 bit/Hz/s in the original 3GPP Release 6, and therefore the 3GPP commenced on a study on the Enhanced Multimedia Broadcast/Multicast Service (E-MBMS) in the Long Term Evolution (LTE) architecture, with the Single Frequency Network (SFN) transmission technology in the existing industry terrestrial broadcasting standard being introduced into the E-MBMS.

Figure 1:
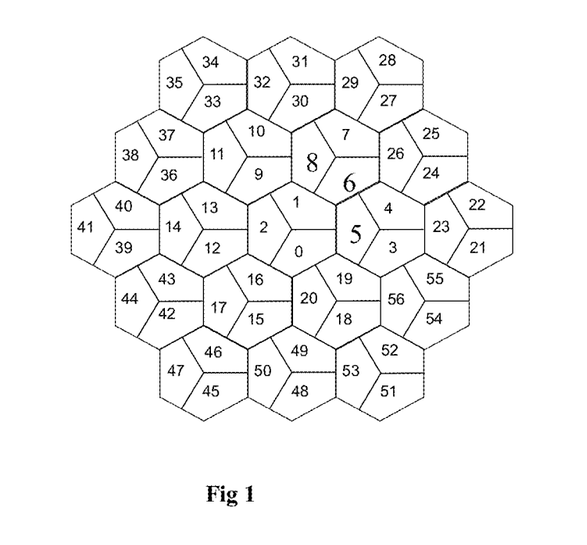
FIG. 1 is a topology diagram of the structure of an SFN network in the prior art.

The SFN transmission technology refers to that the same MBMS data is transmitted concurrently in all cells of an SFN network using the same physical resources, e.g., the same frequency, the same code channel, the same scrambling code, and the same channel estimation code, so that even a user equipment in an edge zone of the cell may receive available signals from different cells. The user equipment can not only integrate energies of all the received available signals directly in an air interface but also obtain diversity gains from different paths. FIG. 1 illustrates a topology diagram of the structure of an SFN network in which each cell is consisted of three sectors sharing a station address, that is, these three sectors have the same base station address. A specific current implementation solution of the SFN transmission technology in the 3GPP E-MBMS is described below taking the structure of the SFN network as an example: when a core network initiates a broadcast service, a Radio Network Controller (RNC) allocates collectively for all sectors in the SFN network the same temporal resources, frequency resources, scrambling code and channel estimation code used for the broadcast service, and the temporal resources, the frequency resources, the scrambling code and the channel estimation code are also used by a user equipment in a cell to receive the broadcast service, that is, as long as a signal from a sector in the SFN network falls within the window of a multi-path receiver of the user equipment, the user equipment may integrate energies of all such signals falling within the reception window directly to thereby improve greatly reception performance of the broadcast service.

Figure 2:
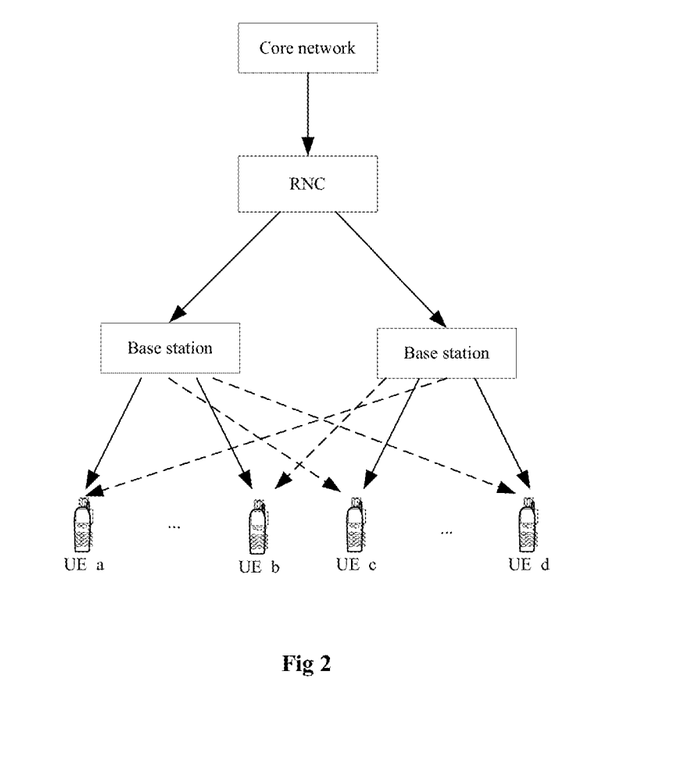
FIG. 2 is a schematic diagram of broadcast service data transmission in a TD-SCDMA system in the prior art.

A method for implementing E-MBMS transmission in an existing SFN network of a Time Division-Synchronous Code Division Multiple Address (TD-SCDMA) system is described below on the basis of resource allocation in the above SFN transmission technology and the implementation thereof Referring to FIG. 2, when a core network initiates a broadcast service and transmits the broadcast service to multiple sectors, a RNC allocates collectively for base stations of the multiple sectors the same broadcast service resources including a transmission time, a transmission frequency, and a scrambling code and a channel estimation (midamble) code used for the broadcast service, and notifies the base stations (Node Bs) and user equipments of information of the broadcast service resources through signaling; the base stations of the respective sectors form broadcast service signals from broadcast service data according to these specific codes and transmit the broadcast service signals using the service recourses allocated by the RNC; after receiving the same broadcast service signals transmitted concurrently from the multiple cells at corresponding recourse locations, the user equipment performs channel estimation using the specified midamble code and descrambles the data using the specified scrambling code to thereby derive the desired broadcast service data. The method generally includes the following steps:

Step 1: The core network initiates a broadcast service and notifies the RNC of the broadcast service, and the RNC determines those sectors to which the broadcast service is to be transmitted.

Step 2: The RNC allocates collectively for base stations of those sectors the same broadcast service resources including the same transmission time, transmission frequency, transmission code channel, and scrambling code and midamble code used for the broadcast service.

The codes specified here are different from scrambling codes and midamble codes adopted for the existing non-broadcast services. Groups of codes relatively correlative with the existing scrambling codes and midamble codes may be designated in advance for broadcast services and dedicated to scrambling codes and midamble codes of the broadcast services, to thereby form a table of broadcast service code groups, which is stored in the RNC, user equipments and base stations, and upon allocation of resources for a specific broadcast service, the RNC selects a pair of codes from the table and informs the base stations and the user equipments about a serial number corresponding to the code group, thereby reducing a signaling load.

Step 3: Upon transmission of the broadcast service, the base station forms broadcast service signals from relevant broadcast service data according to the scrambling code and the midamble code allocated by the RNC and transmits the broadcast service signals using the service resources allocated by the RNC.

Step 4: The user equipment receives the signals over corresponding resources according to the resource allocation information transmitted from the RNC. Signals transmitted from multiple cells may be received by the user equipment, and at this time the user equipment performs channel estimation according to the specified midamble code to derive an overall condition of channels from the multiple cells to the user equipment, and then de-spreads the data based upon a result of the channel estimation and subsequently descrambles the de-spreaded data using the specified scrambling code to derive the desired broadcast service data.

Figure 3:
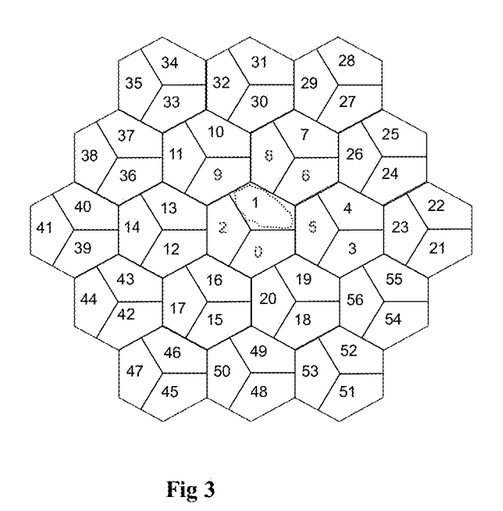
FIG. 3 is a schematic diagram of adjacent cells in an SFN network in the prior art.

Some drawbacks are still to be overcome in the existing E-MBMS transmission method despite its significant improvement over the traditional MBMS transmission technology. For adjacent sectors in an SFN network, the phenomenon of fast fading of a signal may likely occur in adjacent edge zones of the sectors, and this phenomenon refers to that when the same signals are transmitted from two base stations, if the signals arrive at a receiver of a user equipment concurrently but with opposite phases, then energy of the received signals may be superposed totally inversely, resulting in significant rapid attenuation and hence a considerably degraded quality of the received signals. This phenomenon may be more appreciable in adjacent edge zones of adjacent sectors in the same cell due to the extremely similar channel environment in the adjacent edge zones of the adjacent sectors in the same cell. As illustratively shown in FIG. 3, two adjacent sectors in the same cell, e.g., sectors 1 and 0, 1 and 2, and 0 and 2, share a common station address and hence the channel environments of the adjacent edge zones of the two adjacent sectors are extremely similar, so that service signals transmitted from two base stations of the adjacent sectors may likely arrive at the edge zones of the two adjacent sectors simultaneously. Further, the two service signals from the adjacent sectors may likely have identical or opposite phases due to their relatively similar fading features. In the case that the two service signals have opposite phases, energy of the two signals arriving at the user equipment may be superposed totally inversely, resulting in significant rapid attenuation and hence a considerably degraded quality of the received signals, which has also been demonstrated from simulation results.

SUMMARY OF THE INVENTION

The invention provides a method, system and device for transmitting broadcast service data in a single frequency network so as to eliminate the phenomenon of fast fading of received signals in the prior art, which occurs at adjacent edge zones of adjacent sectors in the same cell of the single frequency network.

The invention provides a method for transmitting broadcast service data in a single frequency network including a Radio Network Controller and one or more base stations each with a cell including one or more sectors, and the method includes:

A. transmitting, by the Radio Network Controller, broadcast service data and a first transmission time to the base stations; and
B. transmitting, by the base station, the broadcast service data to each sector of the base station after the first transmission time, where the broadcast service data is transmitted to adjacent sectors at different transmission times.

The method further includes:
grouping the sectors in advance so that adjacent sectors in the same cell are grouped in different groups each of which corresponds to a different delay unit,
and the step B includes:
calculating, by the base station, a second transmission time for transmitting the broadcast service data in each sector of the base station from the first transmission time and the delay unit corresponding to the sector, where the second transmission time corresponding to the sector is a sum of the first transmission time and the delay unit corresponding to the sector, and transmitting the broadcast service data to the sector at the second transmission time corresponding to the sector.

The delay unit is set dependent upon whether a primary path along which the base station transmits the broadcast service data falls within a multi-path reception window of a user equipment.

The delay unit is less than or equal to the size of the multi-path reception window of the user equipment from which a path delay required for transmitting the broadcast service data is subtracted.

A system for transmitting broadcast service data in a single frequency network includes:
a Radio Network Controller adapted to transmit broadcast service data and a first transmission time to a base station; and
the base station adapted to transmit the broadcast service data to each sector of the base station after the first transmission time, where the broadcast service data is transmitted to adjacent sectors at different transmission times.

The base station stores delay units corresponding to its respective sectors, with adjacent sectors corresponding to different delay units; calculates a second transmission time for transmitting the broadcast service data in each sector from the first transmission time and the delay unit corresponding to the sector, where the second transmission time corresponding to the sector is a sum of the first transmission time and the delay unit corresponding to the sector; and transmits the broadcast service data to the sector at the second transmission time corresponding to the sector.

The delay unit is less than or equal to the size of a multi-path reception window of a user equipment from which a path delay required for transmitting the broadcast service data is subtracted.

A base station connected with a Radio Network Controller includes:
a time determination unit adapted to determine a transmission time for transmitting broadcast service data to each sector of the base station according to a first transmission time transmitted from the Radio Network Controller, where the broadcast service data is transmitted to adjacent sectors at different transmission times; and
a transmission unit adapted to transmit the broadcast service data to the respective sectors at the determined transmission times.

The time determination unit includes:
a storage unit adapted to store the first transmission time transmitted from the Radio Network Controller and delay units corresponding to the respective sectors of the base station, where the adjacent sectors correspond to different delay units; and
a calculation unit adapted to calculate a second transmission time for transmitting the broadcast service data in each sector of the base station from the first transmission time transmitted from the Radio Network Controller and the delay unit corresponding to the sector, where the second transmission time corresponding to the sector is a sum of the first transmission time and the delay unit corresponding to the sector.

The delay unit is less than or equal to the size of a multi-path reception window of a user equipment from which a path delay required for transmitting the broadcast service data is subtracted.

As compared with the prior art, the base station in the present invention transmits the broadcast service data to each sector of the base station after the first transmission time allocated by the RNC, where the broadcast service data is transmitted to adjacent sectors sharing a common station address at different transmission times, that is, introduction of different delay units to the times for transmitting the broadcast service data in the adjacent sectors of the same cell avoids the phenomenon of rapid attenuation of received signals, which occurs at adjacent edge zones of the adjacent sectors in the same cell, thus improving performance of receiving the signals at the edge zones of the sectors.

DETAILED DESCRIPTION OF THE EMBODIMENTS

The present invention provides a method for transmitting broadcast service data in a single frequency network, and this method is implemented as follows: when broadcast service data is to be transmitted in adjacent sectors of a single frequency network, different transmission delays are introduced to a transmission time allocated collectively by an RNC to eliminate the phenomenon of rapid attenuation of received signals due to concurrent arrival, of broadcast service signals transmitted from adjacent sectors in the same cell, at adjacent edge zones of the adjacent sectors.

Figure 4:
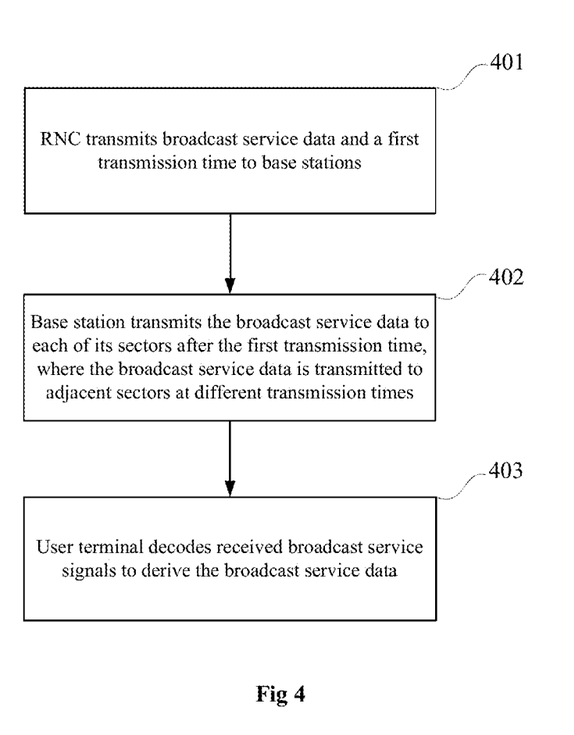
FIG. 4 is a flow chart of a method according to the present invention.

The present method provides a method for transmitting broadcast service data in a single frequency network, applicable in the single frequency network including a Radio Network Controller and one or more base stations each with a cell including one or more sectors sharing a common base address. Referring to FIG. 4, a specific flow of implementing the present method is as follows:

Step 401: The RNC transmits broadcast service data and a first transmission time to the base stations.

The core network initiates a broadcast service and notifies the RNC of the broadcast service, and the RNC determines those sectors in the single frequency network to which the broadcast service is to be transmitted, allocates collectively for those sectors the same service resources and transmits broadcast service data and information on these service resources to base stations and user equipments of all the sectors for transmitting the service, where the information on the service resources includes at least a first transmission time, a transmission frequency, a code channel, and a scrambling code and a channel estimation code.

Particularly, scrambling codes and channel estimation codes dedicated to the broadcast service may be stored in advance in a table of service code groups, which is in turn stored in the RNC, the user equipments and the base stations. Upon allocation of resources for the service, the RNC selects a pair of codes from the table and informs the base stations and the user equipments about a serial number corresponding to the code group to thereby reduce a signaling load.

Step 402: The base station transmits the broadcast service data to each of its sectors after the first transmission time, where the broadcast service data is transmitted to adjacent sectors at different transmission times.

Particularly, the sectors in the single frequency network may be grouped in advance so that adjacent sectors in the same cell are grouped in different groups each of which corresponds to a different delay unit. The delay unit may be set dependent upon whether a primary path along which the base station transmits the broadcast service data falls within a multi-path reception window of a user equipment, and is set here as a value less than or equal to the size of the multi-path reception window of the user equipment from which a path delay required for transmitting the broadcast service data is subtracted.

Then, the step 402 is performed as follows: the base station calculates a second transmission time for transmitting the broadcast service data in each of its sectors from the first transmission time and the delay unit corresponding to the sector, where the second transmission time corresponding to the sector is a sum of the first transmission time and the delay unit corresponding to the sector; and transmits the broadcast service data to the sector at the second transmission time corresponding to the sector.

Figure 5:
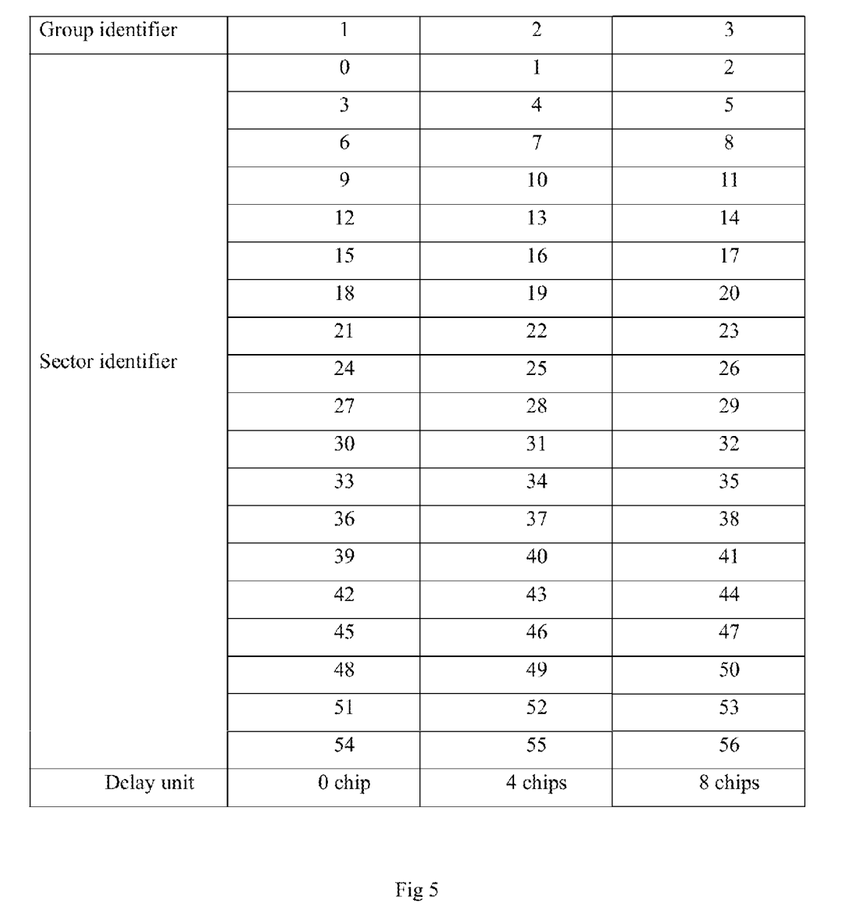
FIG. 5 is a schematic diagram of a table of groups according to an embodiment of the present invention.

Preferably, it is possible to store in the base station a table of groups including one or more group identifiers, sector identifiers and delay units, where a group identifier corresponds to one or more sector identifiers and a delay unit, and the delay unit varies from one group identifier to another. In order to ensure that adjacent sectors in the same cell are not grouped in the same group, sector identifiers of adjacent sectors in the same cell correspond to different group identifiers in the table of groups. Taking the SFN network illustrated in FIG. 3 as an example, the resulting table of groups is as illustrated in FIG. 5, in which adjacent sectors 0, 1 and 2 in the same cell are in different groups, that is, sector identifiers 0, 1 and 2 correspond respectively to group identifiers 1, 2 and 3, and alike sectors 3, 4 and 5 are in different groups, sectors 6, 7 and 8 are in different groups, sectors 9, 10 and 11 are in different groups, etc. Also, the group identifiers 1, 2 and 3 correspond respectively to delay units of 0, 4 and 8 chips.

Upon transmission of the broadcast service data, the base station uses the scrambling code and the channel estimation code allocated by the RNC in the step 401 to form broadcast service data signals from the broadcast service data transmitted from the RNC, and transmits the broadcast service data signals to corresponding sectors according to the determined second transmission times and the transmission frequency allocated by the RNC in the step 401.

Step 403: The user equipment decodes the received broadcast service data signals to thereby derive the broadcast service data.

The user equipment receives the broadcast service data signals over corresponding resources according to the service resource information transmitted from the RNC. Upon receipt of broadcast service data signals transmitted from a plurality of sectors, the user equipment performs channel estimation according to the channel estimation code specified by the RNC to derive an overall condition of channels from the plurality of sectors to the present user equipment, and then de-spreads the data based upon a result of the channel estimation and subsequently descrambles the de-spreaded data using the specified scrambling code to derive the desired broadcast service data. Simulation results show that signal transmission according to the present invention is superior in performance to the existing technical solution.

Figure 6:
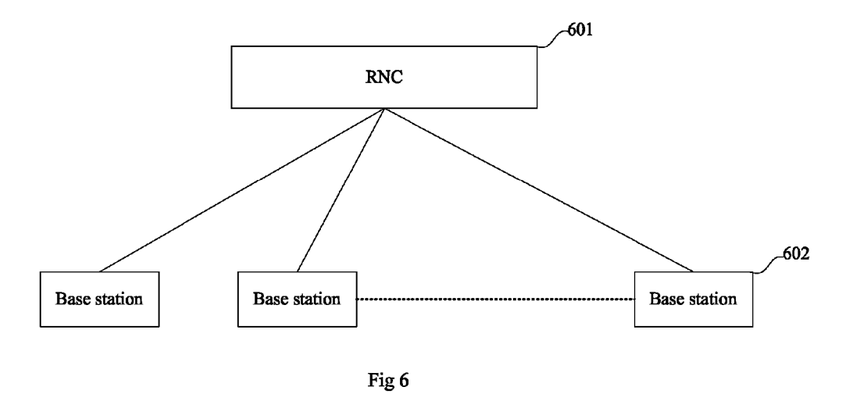
FIG. 6 is a schematic diagram of the structure of a system according to the present invention.

The invention further provides a system for transmitting broadcast service data in a single frequency network, and the system includes a Radio Network Controller 601 and base stations 602, as illustrated in FIG. 6, where the Radio Network Controller 601 is adapted to transmit broadcast service data and a first transmission time to the base stations, and the base stations 602 are adapted to transmit the broadcast service data to each of their sectors after the first transmission time, where the broadcast service data is transmitted to adjacent sectors at different transmission times.

The base stations 602 are adapted to store delay units corresponding to their respective sectors, where the adjacent sectors correspond to different delay units; calculate a second transmission time for transmitting the broadcast service data in each of their sectors from the first transmission time and the delay unit corresponding to the sector, where the second transmission time corresponding to the sector is a sum of the first transmission time and the delay unit corresponding to the sector; and transmit the broadcast service data to the sector at the second transmission time corresponding to the sector. The delay time is less than or equal to the size of a multi-path reception window of a user equipment from which a path delay required for transmitting the broadcast service data is subtracted.

Figure 7:
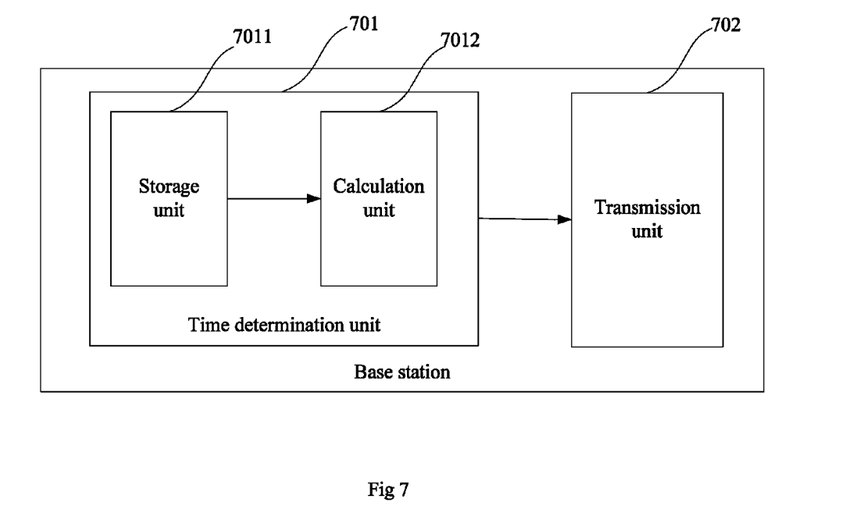
FIG. 7 is a schematic diagram of the structure of a base station according to the present invention.

The present invention further provides a base station, which is applicable in a system for transmitting broadcast service data in a single frequency network and is connected with a Radio Network Controller. As illustrated in FIG. 7, the base station includes a time determination unit 701 and a transmission unit 702. The time determination unit 701 is adapted to determine a transmission time for transmitting broadcast service data to each sector of the base station according to a first transmission time from the Radio Network Controller, and the broadcast service data is transmitted to adjacent sectors at different transmission times. The transmission unit 702 is adapted to transmit the broadcast service data to the respective sectors at the determined transmission times.

The time determination unit 701 includes a storage unit 7011 and a calculation unit 7012. The storage unit 7011 is adapted to store the first transmission time transmitted from the Radio Network Controller and delay units corresponding to the respective sectors of the base station, where the adjacent sectors correspond to different delay units. The calculation unit 7012 is adapted to calculate a second transmission time for transmitting the broadcast service data in each sector from the first transmission time transmitted from the Radio Network Controller and the delay unit corresponding to the sector, where the second transmission time corresponding to the sector is a sum of the first transmission time and the delay unit corresponding to the sector. The delay unit is less than or equal to the size of a multi-path reception window of the user equipment from which a path delay required for transmitting the broadcast service data is subtracted.

Evidently, those skilled in the art can make various modifications and variations to the invention without departing from the scope of the invention. Accordingly, the invention is intended to encompass these modifications and variations thereof provided that the modifications and variations fall within the scope of the claims appended to the invention and their equivalents.

The invention claimed is:

1. A method for transmitting broadcast service data in a single frequency network comprising a Radio Network Controller and one or more base stations each with a cell comprising one or more sectors, wherein the method comprises:
   grouping the sectors in advance so that adjacent sectors in the same cell are grouped in different groups each of which corresponds to a different delay unit;
   transmitting, by the Radio Network Controller, broadcast service data and a first transmission time to the base stations;
   calculating, by the base station, a second transmission time for transmitting the broadcast service data in each sector of the base station from the first transmission time and the delay unit corresponding to the sector, wherein the second transmission time corresponding to the sector is a sum of the first transmission time and the delay unit corresponding to the sector, and transmitting the broadcast service data to the sector at the second transmission time corresponding to the sector,
   wherein the delay unit is set dependent upon whether a primary path along which the base station transmits the broadcast service data falls within a multi-path reception window of a user equipment; and
   wherein the delay unit is less than or equal to the size of the multi-path reception window of the user equipment from which a path delay required for transmitting the broadcast service data is subtracted.

2. A system for transmitting broadcast service data in a single frequency network, wherein the system comprises:
   a Radio Network Controller adapted to transmit broadcast service data and a first transmission time to a base station; and
   the base station adapted to store delay units corresponding to respective sectors of the base station, wherein the sectors are grouped in advance so that adjacent sectors in the same cell are grouped in different groups each of which corresponds to a different delay unit; calculate a second transmission time for transmitting the broadcast service data in each sector of the base station from the first transmission time and the delay unit corresponding to the sector, wherein the second transmission time corresponding to the sector is a sum of the first transmission time and the delay unit corresponding to the sector; and transmit the broadcast service data to the sector at the second transmission time corresponding to the sector;
   wherein the delay unit is less than or equal to the size of a multi-path reception window of a user equipment from which a path delay required for transmitting the broadcast service data is subtracted.

3. A base station connected with a Radio Network Controller, wherein the base station comprises:
   a time determination unit adapted to determine a transmission time for transmitting broadcast service data to each sector of the base station according to a first transmission time transmitted from the Radio Network Controller, wherein the broadcast service data is transmitted to adjacent sectors at different transmission times; and
   a transmission unit adapted to transmit the broadcast service data to the respective sectors at the determined transmission times; and
   wherein the time determination unit comprises:
   a storage unit adapted to store the first transmission time transmitted from the Radio Network Controller and delay units corresponding to the respective sectors of the base station, wherein the sectors are grouped in advance so that adjacent sectors in the same cell are grouped in different groups each of which corresponds to a different delay unit; and a calculation unit adapted to calculate a second transmission time for transmitting the broadcast service data in each sector of the base station from the first transmission time transmitted from the Radio Network Controller and the delay unit corresponding to the sector, wherein the second transmission time corresponding to the sector is a sum of the first transmission time and the delay unit corresponding to the sector;

wherein the delay unit is less than or equal to the size of a multi-path reception window of a user equipment from which a path delay required for transmitting the broadcast service data is subtracted.

\* \* \* \* \*